Aug. 25, 1931.　　　　K. C. BLACK　　　　1,820,114

VACUUM TUBE RECTIFIER

Filed April 21, 1930

Inventor:
Knox Charlton Black,
By Byrnes, Townsend & Potter
Attorneys.

Patented Aug. 25, 1931

1,820,114

UNITED STATES PATENT OFFICE

KNOX CHARLTON BLACK, OF BOONTON, NEW JERSEY, ASSIGNOR, BY MESNE ASSIGNMENTS, TO RADIO CORPORATION OF AMERICA, OF NEW YORK, N. Y., A CORPORATION OF DELAWARE

VACUUM TUBE RECTIFIER

Application filed April 21, 1930. Serial No. 446,096.

This invention relates to vacuum tube rectifiers and particularly to methods of and circuits for obtaining a novel relationship between the alternating current voltage impressed upon the tube and the rectified voltage resulting therefrom.

In systems for the automatic regulation of transmission in a carrier wave amplifier, in relays which are to be actuated by a signal of predetermined magnitude and for other special uses, it is desirable to obtain a rectified voltage that bears a substantially linear relation to alternating current signal voltages falling within a predetermined range but which is substantially zero for signal voltages of lesser magnitudes.

Objects of the invention are to provide a method of and vacuum tube circuit for rectification of alternating current voltages, the method being characterized by a substantial absence of any rectified output up to a certain intensity of applied voltages and by an approximately linear response for impressed signals of greater magnitude. More particularly, an object is to provide a method of and circuit for rectification in which, for signal voltages up to a certain magnitude, the rectified output resulting from grid circuit rectification offsets a rectified voltage developed in the input circuit of the vacuum tube.

These and other objects of the invention will be apparent from the following specification, when taken with the accompanying drawings, in which.

Figure 1:
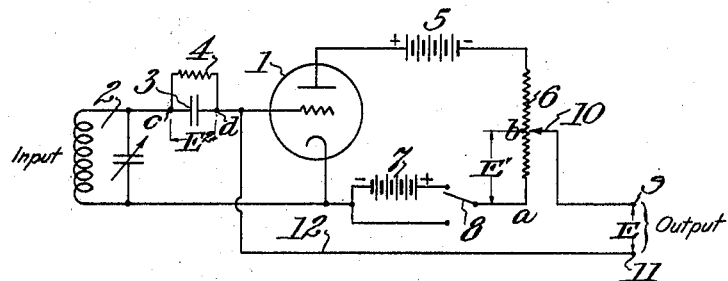
Fig. 1 is a circuit diagram of a rectifier stage embodying the invention.

As shown in Fig. 1, the input circuit for the triode vacuum tube 1 comprises an impedance 2, which may take the form of a tuned circuit, and a condenser 3 shunted by a grid leak 4. The plate-cathode circuit includes a plate battery 5 and a resistance 6 across which the rectified voltage is developed by grid circuit rectification. The battery 5 is preferably connected between the plate and the impedance 6 and, between the cathode and impedance 6, a second battery 7 and shunting switch 8 are provided.

The high voltage terminal 9 of the output circuit is fed from a tap 10 which may be adjusted along the plate impedance 6 and the second terminal 11 of the output circuit is connected through lead 12 to the grid terminal of the vacuum tube. The output circuit is therefore distinguished from the conventional rectifier arrangement in that the low potential terminal is not connected to the cathode of the rectifier.

The output voltage is therefore determined by the rectified voltage developed across the grid condenser 3 and by the rectified voltage developed across the plate impedance 6. The magnitude of the output voltage E may be obtained by a separate study of the voltage $E^1$ developed across the portion of the plate impedance 6 that is included between its lower terminal $a$ and the point $b$ which is engaged by the tap 10, and the voltage $E^2$ developed across the terminals $c$ and $d$ of the grid condenser 3. By appropriate choice of the values of the grid condenser 3 and leak 4, the rectified potential drop across $c$, $d$ will be a linear function of the impressed alternating voltage. So long as the tube operates as a linear current rectifier, the tap 10 may be so positioned that the voltage across $a$, $b$ will be numerically equal to the voltage across $c$, $d$. Since these rectified voltages are of opposite sign, the output voltage across terminals 9 and 11 will be, except for an additive constant, substantially zero irrespective of the value of the impressed signal. For stronger signals, plate rectification and the curvature of the characteristic affect the change in plate current and the voltage developed across the plate impedance 6 will no longer increase as a linear function of the signal voltage, but will eventually become practically constant.

Figure 2:
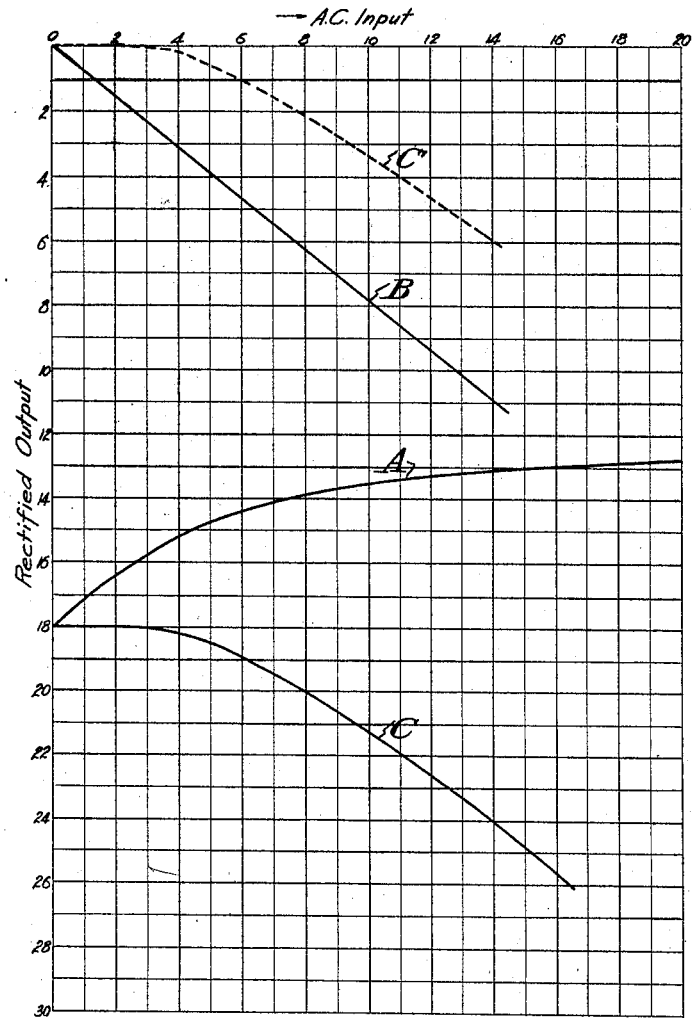
Fig. 2 is a curve sheet showing the relationship between impressed signal voltages and rectified output voltages.

In Fig. 2, the curve A represents the relationship between signal voltage and the voltage $E^1$, and the curve B shows the relationship between the signal voltage and the rectified voltage $E^2$. The curve C for the output voltage E is obtained by combining the curves A and B. A part or all of the direct current component of the plate current may be bucked out by the battery 7. When the potential of battery 7 is just sufficient to offset the steady plate current, the curve C will be shifted to pass through the origin, i. e., to the position indicated by the broken line C'.

A study of the curves will show that the net output voltage remains substantially zero up to the point at which plate rectification becomes apparent, and that beyond that point, the output voltage is a substantially linear function of the signal voltage. When the rectifier circuits are designed to give a direct current output, for example in automatic volume control circuits, it will usually be desirable to include the battery 7 in the output circuit. If audio frequency rectified voltages are desired, the entire plate current supply may be located at the position of the battery 7, since the constant additive potential may be filtered out by a condenser in one of the output leads. For the rectification of modulated radio frequency signals, the rectified voltage may be made independent of the degree of modulation by making the capacity of the condenser 3 sufficiently large.

It will be apparent that the invention is not limited to rectifiers employing triode tubes, since any tube capable of functioning, in cooperation with a grid leak and condenser, as a grid circuit rectifier may be employed.

I claim:

1. In the operation of a vacuum tube rectifier stage having in the input circuit thereof a condenser shunted by a grid leak, the method which comprises combining in the output circuit the rectified potential across said condenser and a rectified voltage developed in the plate-cathode circuit by grid circuit rectification.

2. In the operation of a vacuum tube rectifier having a grid condenser and leak in the input circuit thereof, the method of obtaining a substantially linear output voltage over a range of applied alternating current voltages and substantially no output voltage at inputs below said range, which comprises combining in the output circuit a rectified voltage developed across said grid condenser and a rectified output voltage resulting from grid circuit rectification.

3. The method as set forth in claim 2, wherein the said rectified voltages are combined by connecting the output circuit between the control grid electrode and a point in a plate-cathode impedance.

4. In a vacuum tube rectifier stage, the combination with a tube having a control grid, plate and cathode, of an input circuit including a condenser shunted by a grid leak, a plate-cathode circuit including an impedance, and an output circuit across which is impressed the rectified potential drop across said condenser and the potential drop established across at least a portion of said impedance.

5. In a vacuum tube rectifier stage, the combination with a tube having a control grid, plate and cathode, of an input circuit including a condenser shunted by a grid leak, a plate-cathode circuit including an impedance, and an output circuit connected between said grid and a point on said impedance.

6. In a vacuum tube rectifier stage, the combination with a tube having a control grid, plate and cathode, of an input circuit including a condenser shunted by a grid leak, a plate-cathode circuit including an impedance, and an output circuit connected between said grid and a point on said impedance, said output circuit including means preventing the plate current supply source from establishing a flow of current therein.

In testimony whereof, I affix my signature.

KNOX CHARLTON BLACK.